United States Patent [19]
Dowe et al.

[11] Patent Number: 5,933,666
[45] Date of Patent: Aug. 3, 1999

[54] CAMERA WITH VARIABLE FORMAT VIEWFINDER

[75] Inventors: David R. Dowe, Holley; Paul Teremy; Paul L. Taillie, both of Rochester; Thomas J. Quattrini, Byron, all of N.Y.

[73] Assignee: Eastman Kodak Company, Rochester, N.Y.

[21] Appl. No.: 09/007,425

[22] Filed: Jan. 15, 1998

[51] Int. Cl.$^6$ .................................................. G03B 13/10
[52] U.S. Cl. ............................................................ 396/378
[58] Field of Search .................................. 396/373, 378, 396/379, 380

[56] References Cited

U.S. PATENT DOCUMENTS

| | | |
|---|---|---|
| 5,258,790 | 11/1993 | Tanaka . |
| 5,363,160 | 11/1994 | Fox et al. . |
| 5,389,983 | 2/1995 | Tsunefuji . |
| 5,430,517 | 7/1995 | Zander . |
| 5,523,813 | 6/1996 | Manabe et al. . |
| 5,708,882 | 1/1998 | Yokonuma et al. ................ 396/378 X |

*Primary Examiner*—Howard B. Blankenship
*Attorney, Agent, or Firm*—Roger Fields

[57] ABSTRACT

A camera for taking pictures, comprises a viewfinder masking device having three different format mask configurations; a manual picture-format selector having three different format selection settings which correspond respectively to the three different format mask configurations in order to select any one of the three different format mask configurations; and a default reset for returning the selector to a predetermined one of the three different format selection settings and returning the viewfinder masking device to a corresponding one of the three different format mask configurations, when the selector is in any one of the selection settings that is not the predetermined one, after a picture is taken and before another picture is taken.

5 Claims, 5 Drawing Sheets

CAMERA WITH VARIABLE FORMAT VIEWFINDER

FIELD OF THE INVENTION

The invention relates generally to the field of photography, and in particular to cameras. More specifically, the invention relates to a camera with an adjustable framing or masking device for changing the picture format, i.e. aspect ratio (height x width), of the field of view through the viewfinder.

BACKGROUND OF THE INVENTION

Cameras in the recently introduced "Advanced Photo System" give you not just one print format, but a choice of three. For the classic proportions of a 35 mm print, the photographer chooses the "C" format. For a wider view, the full-frame "H" format is chosen. And for an even wider look, the "P" format is chosen to provide a sweeping panoramic print. The camera records the choice of print format magnetically and/or optically on the filmstrip. The photofinisher's equipment then reads this data, and automatically prints each print in the selected "C", "H" or "P" format. A "C" format print is typically 4×6 inches. An "H" format print is typically 4×7 inches. And a "P" format print is typically 4×10 inches or 4×11.5 inches.

No matter which format "C", "H" or "P" is selected in the camera, the exposed image areas on the filmstrip are always in the "H" format. This allows re-prints to be made in any of the various formats.

In order for the photographer to know how much of the subject being photographed will be included in the "C", "H" or "P" format print, the viewfinder in the camera includes a variable state masking device, such as a mechanical masking blade assembly or an electronic masking liquid crystal display, for framing the subject according to the particular format that is selected. A manually operated format selector is provided to change the state of the masking device to the view the desired format in the viewfinder.

Problem

A "P" format print is significantly more expensive than a "H" format print and a "C" format print since the "P" format print is much longer than the "H" and "C" format prints. After a picture is taken with the camera, the masking device typically remains in the same state as before the picture was taken. If a picture is taken with the masking device in the state for the "P" format and the photographer forgets to operate the format selector to change the state of the masking device before further pictures are taken, each one of the prints will be in the "P" format. This may be disappointing to the photographer, particularly because of the costly photofinishing charge.

SUMMARY OF THE INVENTION

A camera for taking pictures, comprising:

a viewfinder masking device having three different format mask configurations;

a manual picture-format selector having three different format selection settings which correspond respectively to the three different format mask configurations in order to select any one of the three different format mask configurations; and a default reset for returning the selector to a predetermined one of the three different format selection settings and returning the viewfinder masking device to a corresponding one of the three different format mask configurations, when the selector is in any one of the selection settings that is not the predetermined one, after a picture is taken and before another picture is taken.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

The Preferred Embodiment

Figure 1:
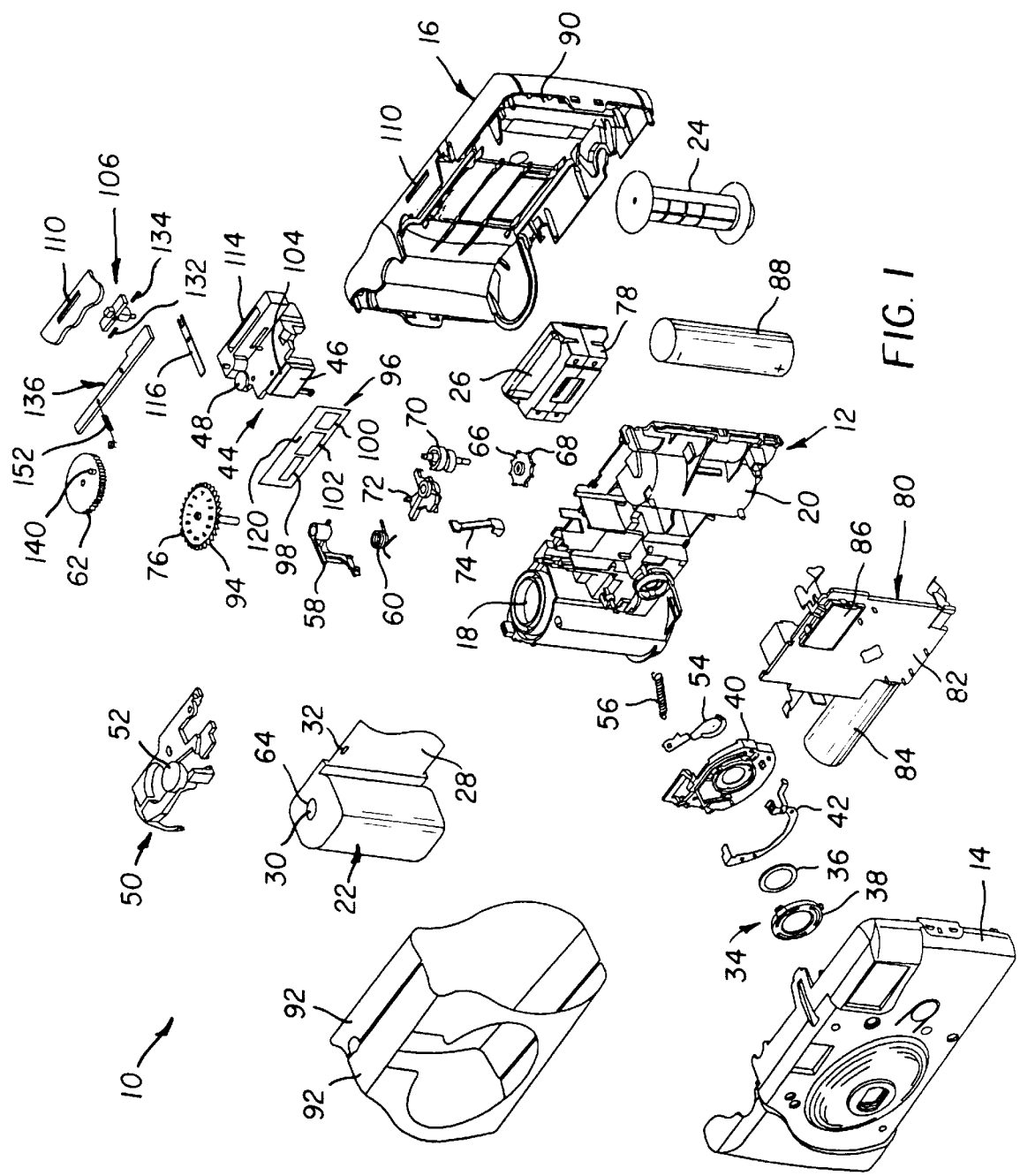
FIG. 1 is an exploded perspective view of a one-time-use camera including a variable format viewfinder and an automatic default resetting mechanism for the viewfinder according to a preferred embodiment of the invention.
Figure 2:
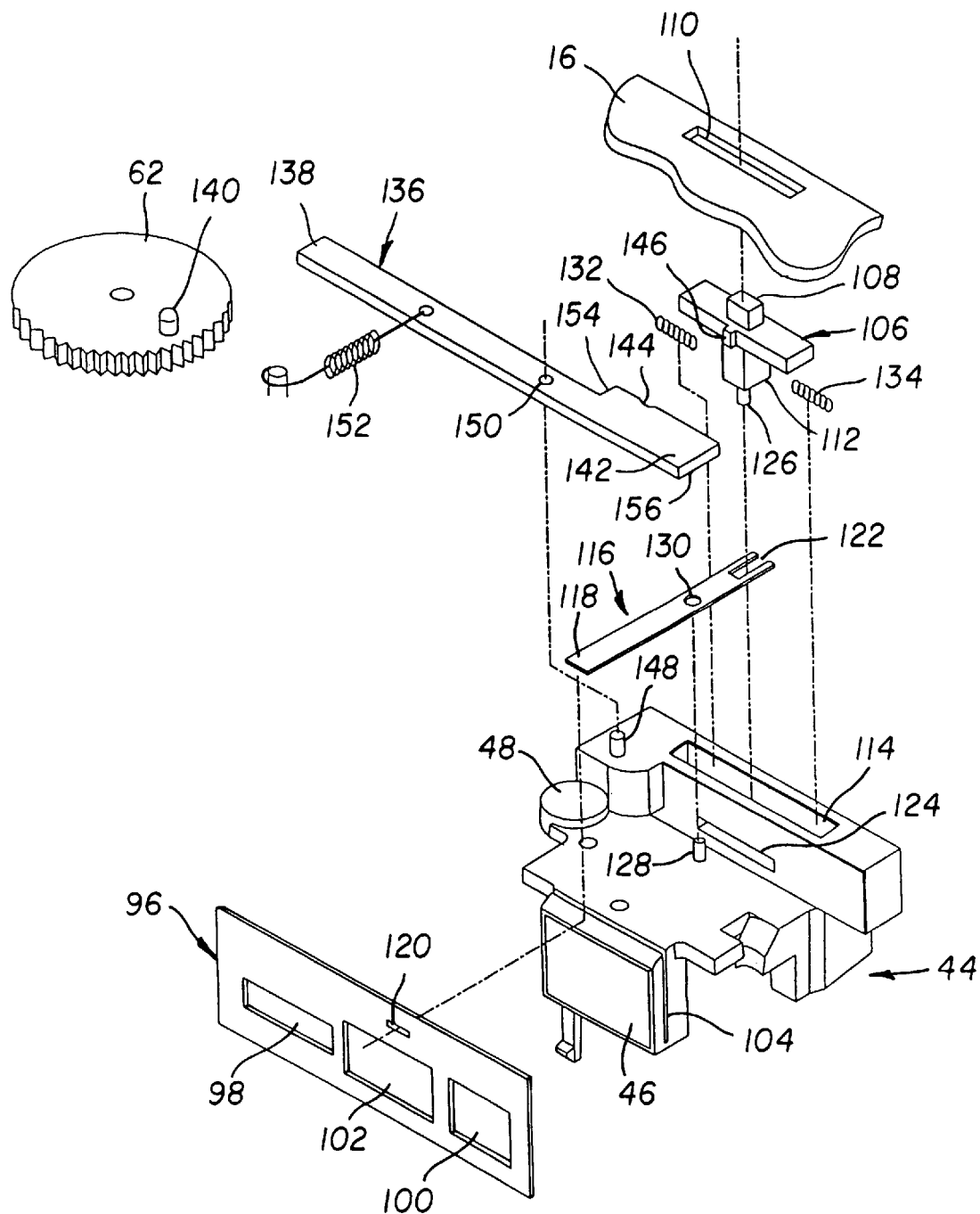
FIG. 2 is an exploded perspective view of the variable format viewfinder and automatic default resetting mechanism.

Referring now to the drawings, FIG. 1 shows a one-time-use camera 10 having a plastic opaque main body part 12, and a pair of plastic opaque front and rear cover parts 14 and 16 which connect to one another to house the main body part between them in order to complete the camera assembly. The main body part 12 is adapted to be nested in the front cover part 14, and the rear cover part 16 is intended to be fitted to the main body part 12 to make the main body part light-tight.

As shown in FIG. 1, the main body part 12 has integral cartridge-receiving and unexposed film roll chambers 18 and 20 for a known film cartridge 22 and a film supply spool 24. The cartridge receiving and unexposed film roll chambers 18 and 20 are located at opposite sides of a backframe opening 26 at which successive frames of a filmstrip 28 are exposed during picture-taking. The filmstrip 28 is originally provided in a roll form on a cartridge spool 30 in the film cartridge 22, but is transferred to the film supply spool 24 during camera manufacture. A longitudinal series of engageable edge perforations 32 are provided in the filmstrip 28.

The main body part 12 supports various known camera elements which are connected to the main body part before it is nested in the front cover part 14 and the rear cover part 16 is fitted to the main body part. These camera elements are a lens unit 34 comprising a fixed-focus taking lens 36 sandwiched between a snap-on lens retainer 38 and a lens support plate 40, which is connected to the main body part 12 at its front; a shutter-flash synchronization switch contact 42 attached to the lens support plate 40; a viewfinder unit 44 comprising an integral front viewfinder lens 46, an integral rear viewfinder lens, not shown, and an integral frame magnifier 48, which is connected to the main body part at its top; a shutter mechanism comprising a keeper plate 50 having an integral manually depressable shutter release button 52 for releasing a pivotally mounted shutter blade 54, a shutter return spring 56, a high-energy lever 58 for actuating the shutter blade to pivot the blade open in order to uncover the taking lens to make a film exposure, and a lever actuating spring 60; a film advancing and metering mechanism comprising a manually rotatable thumbwheel 62 for engaging a flush end 64 of the cartridge spool 30 to rotate the spool counter-clockwise in FIG. 1 in order to wind an exposed frame of the filmstrip 28 into the film cartridge 22 after each picture is taken and to move an unexposed frame from the unexposed film roll on the film supply spool 24 to the backframe opening 26 for the next exposure, a film metering sprocket 66 having an annular array of peripheral teeth 68 for successively engaging the respective perforations 32 in the filmstrip, and a cooperating metering cam 70, metering lever 72 and metering spring 74 that operate in a known manner in conjunction with a rotatable frame counter 76 (made readable via the frame magnifier 48), the thumbwheel 62, and the metering sprocket 66 to rotate the frame counter to its next lower-numbered setting and to lock the thumbwheel (until the shutter release button 52 is manually depressed) after the thumbwheel is rotated to wind an exposed frame into the film cartridge 22; a light baffle 78 which forms the backframe opening 26; and an electronic flash illumination assembly 80 comprising a circuit board 82, a capacitor 84, a flash emission lens 86, and a flash battery 88. The battery 88 is held in a battery-receiving chamber 90 in the rear cover part 16. A pair of front and rear decorative labels 92 cover central portions of the front and rear cover parts 14 and 16 after the front and rear cover parts are connected to one another to house the main body part 12 between them.

The metering sprocket 66 and the metering cam 70 are coaxially fixed to one another for concurrent coaxial rotation when the thumbwheel 62 is manually rotated to rotate the cartridge spool 30 in order to wind an exposed frame of the filmstrip 28 into the film cartridge 22 after each picture is taken. The metering cam 70 has an integral single tooth, not shown. Each time the metering cam 70 is rotated in response to film advancement the tooth intermittently engages the frame counter 76 in one of its peripheral recesses 94 to rotate the frame counter to its next lower-numbered setting As shown in FIGS. 1–6, a masking blade 96 has a pair of spaced different format mask openings 98 and 100 and a third format mask opening 102 midway between the pair of different format mask openings. The masking blade 96 is supported for sliding movement back and forth (to the right and left in the FIGS.) immediately behind the front viewfinder lens 46, within a slit 104 in the viewfinder unit 44. The pair of different format mask openings 98 and 100 have the standard "P" format, i.e. panoramic, and "C" format, i.e. classic, aspect ratios. The third format mask opening 102 has the standard "H" format, i.e. substantially full frame, aspect ratio. The masking blade 96 is intended to be slide back and forth along the slit 104 to separately locate each one of the three masking openings 98, 100 and 102 between the front viewfinder lens 46 and the rear viewfinder lens, to frame a subject to being photographed in accordance with the desired "C", "H" or "P" format.

A manually operated format selector 106 is provided to change the position of the masking slide 96 along the slit 104 to view the desired "C", "H" or "P" format between the front viewfinder lens 46 and the rear viewfinder lens. The selector 106 has a knob 108 that protrudes from a slot 110 in the top of the rear cover part 16 to facilitate its manual operation and a base 112 that is supported for sliding movement back and forth (to the right and left in FIG. 2) within a channel 114 in the viewfinder unit 44. A lever 116 has one end portion 118 that extends through a wider slot 120 in the masking blade 96 and an opposite end portion 122 that extends through a wider lead-in slot 124 to the slot 114 in the viewfinder unit 44 and is forked to loosely engage a drive pin 126 projecting from the base 112 of the selector 106. A fixed pin 128 projects from the viewfinder unit 44 through a center opening 130 in the lever 116 to pivotally support the lever. A pair of helical compression springs 132 and 134 in the channel 114 of the viewfinder unit 44 continuously urge the selector 106 to a middle position, shown in FIG. 3, in which the masking blade 96 is positioned with its masking opening 102 between the front viewfinder lens 46 and the rear viewfinder lens to frame a subject being photographed in accordance with the desired "H" format. If the selector 106 is slid to the right to a right-end position as in FIG. 4 from its middle position in FIG. 3, the lever 116 will be pivoted clockwise about the fixed pin 128 to slide the masking blade 96 to the left and re-position the masking blade with its masking opening 100 between the front viewfinder lens 46 and the rear viewfinder lens to frame a subject being photographed in accordance with the desired "C" format. If the selector 106 is slid to the left to a left-end position as in FIG. 5 from its middle position in FIG. 3, the lever 116 will be pivoted counter-clockwise about the fixed pin 128 to slide the masking blade 96 to the right and re-position the masking blade with its masking opening 98 between the front viewfinder lens 46 and the rear viewfinder lens to frame a subject being photographed in accordance with the desired "P" format.

Figure 3:
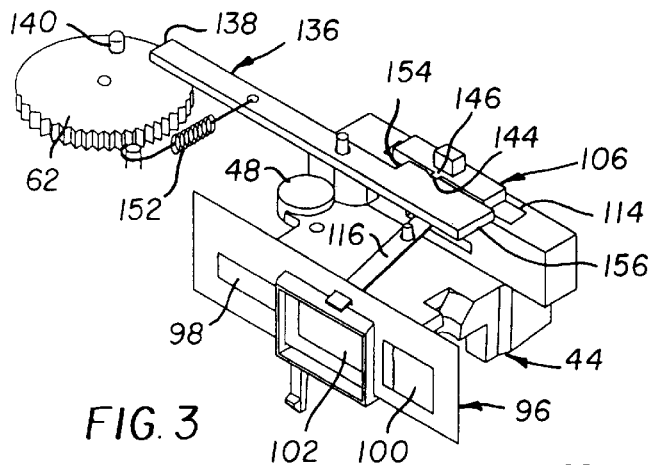
FIGS. 3, 4, 5 and 6 are assembled perspective view of the variable format viewfinder and automatic default resetting mechanism depicting their operation.
Figure 4:
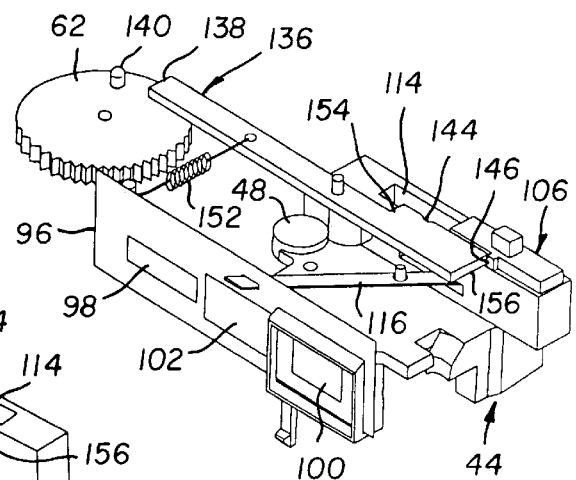
Figure 5:
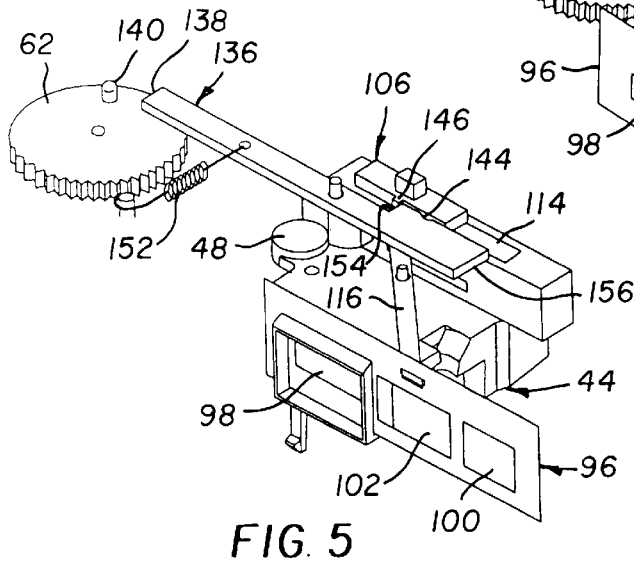
Figure 6:
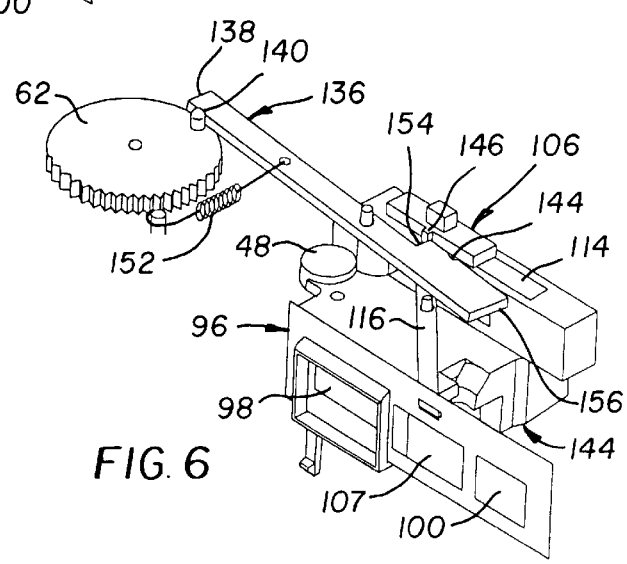

A lever 136 has one end portion 138 that is located within range of a protuberance 140 on the manually rotatable thumbwheel 62 and an opposite end portion 142 with a notch 144. that is adapted to receive a protuberance 146 on the selector 106 only when the selector is in its middle position shown in FIG. 3. A fixed pin 148 projects from the viewfinder unit 44 through an intermediate opening 150 in the lever 136 to pivotally support the lever. A helical tension spring 152 urges the lever 136 to pivot counter-clockwise in FIG. 3 to maintain the notch 144 at the protuberance 146 in FIG. 3. When the selector 106 is in its left-end position as shown in FIG. 5, a stop edge 154 of the lever 136 abuts the protuberance 146 to hold the selector in that position against the contrary urging of the spring 132. If the thumbwheel 62 is rotated counter-clockwise in FIG. 5 to similarly rotate the cartridge spool 30 in order to wind an exposed frame of the filmstrip 28 into the film cartridge 22 after a picture is taken, the protuberance 140 will move against the end portion 138 of the lever 130 and pivot the lever clockwise in FIG. 6 to separate the stop edge 154 of the lever from the protuberance 146, which allows the spring 132 to slide the selector 106 to the right to its middle position shown in FIG. 3. When the selector 106 is in its right-end position as shown in FIG. 4, an end edge 156 of the lever 136 abuts the protuberance 146 to hold the selector in that position against the contrary urging of the spring 134. If the thumbwheel 62 is rotated counter-clockwise in FIG. 4 to similarly rotate the cartridge spool 30 in order to wind an exposed frame of the filmstrip 28 into the film cartridge 22 after a picture is taken, the protuberance 140 will move against the end portion 138 of the lever 130 and pivot the lever clockwise in FIG. 4 to separate the end edge 156 of the lever from the protuberance 146, which allows the spring 134 to slide the selector 106 to the left to its middle position shown in FIG. 3.

The Alternate Embodiment

Figure 7:
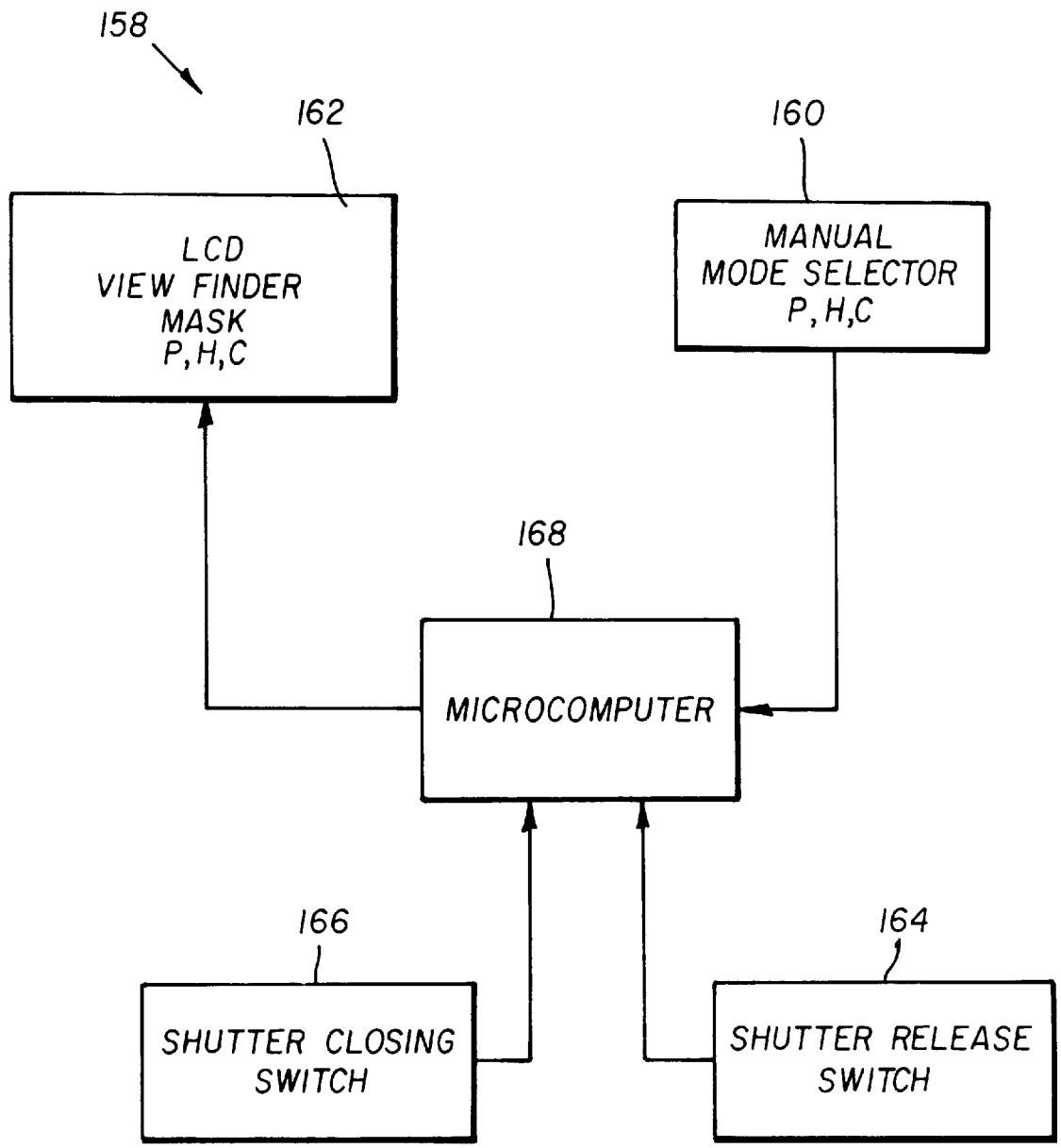
FIG. 7 is a schematic view of another variable format viewfinder and automatic default resetting mechanism according to an alternate embodiment of the invention.

FIG. 7 schematically shows a reloadable camera 158 comprising a manual mode selector 160 having "H", "C"

and "P" format selection settings, a liquid crystal display (LCD) viewfinder mask 162 having "C", "H" and "P" mask configurations for framing a subject being photographed in accordance with the "C", "H" and "P" format selection settings of the selector, a shutter release switch 164 for sensing that a shutter has been opened to take a picture, a shutter closing switch 166 for sensing that the shutter has closed to complete picture-taking, and a control micro computer 168 connected to the selector, the LCD viewfinder mask, the shutter release switch and the shutter closing switch.

Figure 8:
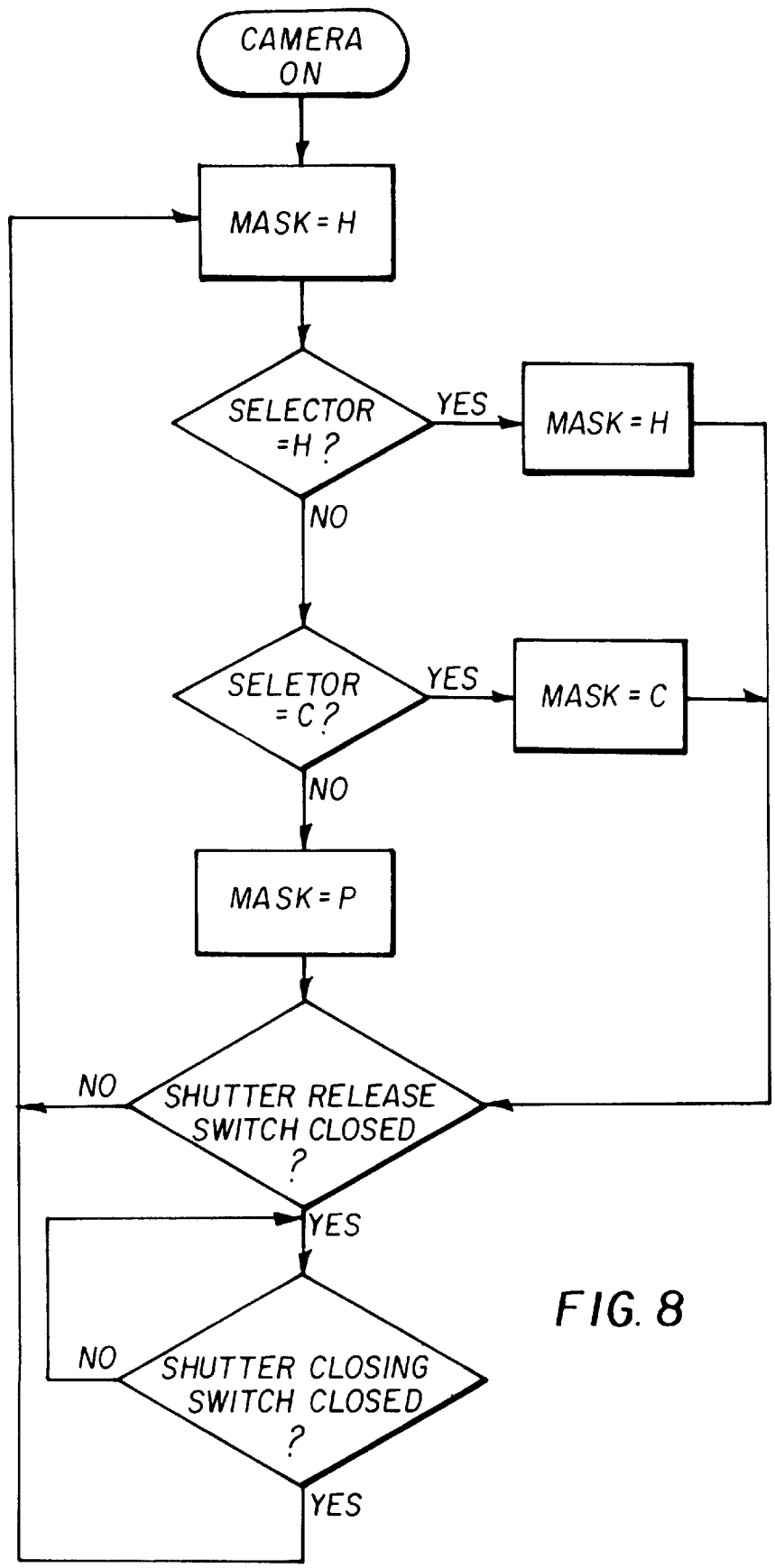
FIG. 8 is a flow chart depicting operation of the variable format viewfinder and automatic default resetting mechanism shown in FIG. 7.

As shown in FIG. 8, when the reloadable camera 158 is turned "On", the LCD viewfinder mask 162 is always originally in the "H" format mask configuration and the selector 160 is in the corresponding "H" format selection setting.

If the photographer changes the selector 160 to the "C" format selection setting, the LCD viewfinder mask 162 will be changed to the "C" format mask configuration. If the photographer changes the selector 160 to the "P" format selection setting, the LCD viewfinder mask 162 will be changed to the "P" format mask configuration.

Before the shutter release switch 164 is closed the microcomputer 168 continuously determines whether the selector 160 is in the "H" or "C" format selection setting as in FIG. 8. If the microcomputer 168 determines the selector 160 is in neither one of the "H" or "C" format selection settings, it assumes that the photographer has changed the selector to the "P" format selection setting.

When the shutter release switch 164 and the shutter closing switch 166 are successively closed, and the LCD viewfinder mask 162 is not in the "H" format mask configuration and the selector 160 is not in the corresponding "H" format selection setting, the LCD viewfinder mask is returned to that mask configuration and the selector is returned to that selection setting. This is done before another picture can be taken.

The invention has been described with reference to a preferred embodiment. However, it will be appreciated that variations and modifications can be effected by a person of ordinary skill in the art without departing from the scope of the invention. For example, instead of the two compression springs 132 and 134 in FIG. 2, a single leaf spring or other known spring can be used for the same purpose.

What is claimed is:

1. A camera for taking pictures, comprising:

a manual picture-format selector supported for movement between at least two different picture-format selection positions;

a spring continuously urging said selector to a predetermined one of said selection positions;

a retainer for maintaining said selector in a different one of said selection positions; and a release for separating said retainer and said selector after a picture is taken to permit said spring to move said selector automatically to the predetermined one of said selection positions before another picture is taken.

2. A camera as recited in claim 1, wherein a film winding wheel is supported for rotation to wind an exposed section of a filmstrip onto a film spool after each picture is taken and is connected with said release to separate said retainer from said selector when said film winding wheel is rotated.

3. A camera for taking pictures, comprising:

a manual picture-format selector supported for movement between a pair of spaced different format selection positions and to a third format selection position midway between said pair of different format selection positions;

at least one spring that continuously urges said selector to said third format selection position from each one of said pair of different format selection positions;

a retainer for maintaining said selector in each one of said pair of different format selection positions; and a release for separating said retainer and said selector after a picture is taken to permit said spring to move said selector automatically to said third format selection position before another picture is taken.

4. A variable format viewfinder comprising:

a manual format selector supported for movement between a pair of spaced different format selection positions and to a third format selection position midway between said pair of spaced different format selection positions; and at least one spring that continuously urges said selector to said third format section position from each one of said pair of spaced different format selection positions.

5. A camera as recited in claim 4, wherein a single viewfinder masking blade is coupled to said selector for movement with the selector and has a pair of spaced different format mask openings corresponding respectively to the pair of different format selection positions of said selector and a third format mask opening midway between said pair of different format mask openings and corresponding to the third format selection position of said selector.

* * * * *